Sept. 24, 1935.  S. S. SWANSON  2,015,245
SPREADER
Filed July 12, 1933
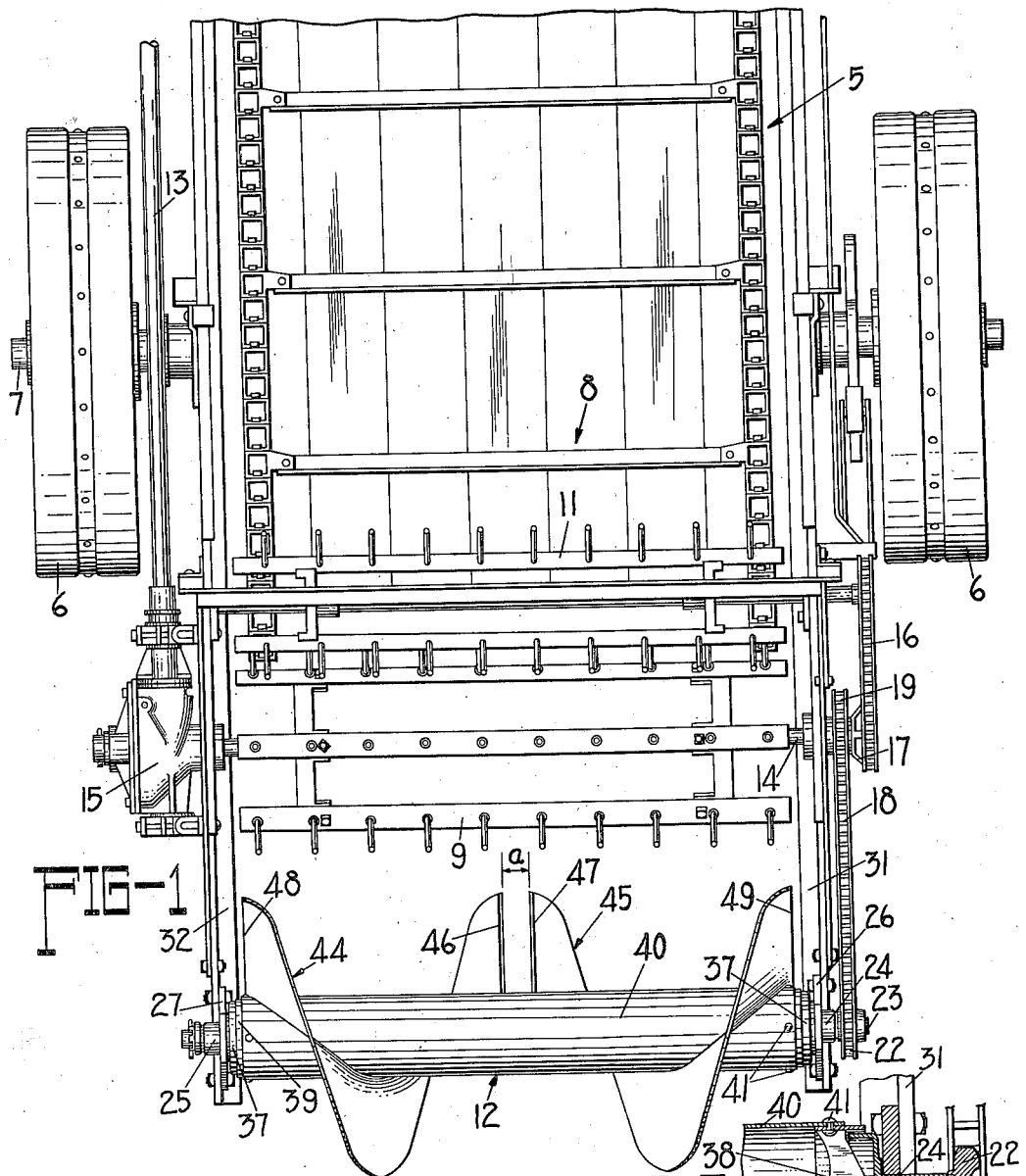
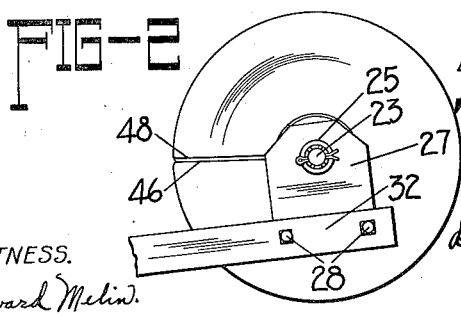
INVENTOR
Stanley S. Swanson
BY Brown, Jackson, Boettcher & Dienner
ATTORNEYS.
WITNESS.
Edward Melin.

Patented Sept. 24, 1935

2,015,245

UNITED STATES PATENT OFFICE 2,015,245

SPREADER

Starley S. Swanson, Moline, Ill., assignor to Deere & Company, Moline, Ill., a corporation of Illinois Application July 12, 1933, Serial No. 680,041

5 Claims. (Cl. 275—6)

The present invention relates to fertilizer distributors of the type comprising a vehicle body mounted on front and rear wheels, beating mechanism and a wide spread device mounted adjacent the rear end of the vehicle body, and a traveling conveyor, the upper course of which feeds the contents of the vehicle body gradually rearwardly to the distributing apparatus, and more particularly to the wide spread device which is mounted on the spreader in rear of the beater or beaters which acts to cause the particles of manure thrown upon it by the beaters to be spread out laterally in a swath or strip considerably wider than the path of the machine.

It is generally known that in order to operate to the best advantage the essential characteristics of such a wide spread device are that it should be statically and dynamically balanced so that it will run smoothly and will not place undue loads on the bearings; that it should spread the distributed material evenly over the entire width that it covers; and should be so constructed that straw, pieces of binder twine, and other strand or similar material that may be in the manure acted upon will not wrap around the ends of the wide spread device and become wedged between the wide spread device and the bearings of the shaft thereof.

A statically and dynamically balanced wide spread device may be readily produced by providing diametrically oppositely disposed spreading elements extending or distributed along the length of the axis or drum of the wide spread device, such an arrangement being obtained by providing two diametrically opposed helicoid shaped members or vanes along the entire length of the drum from end to end and spaced apart 180°, but since the same spreading action can be obtained with a single helicoid shaped vane operating at twice the speed, it is very desirable for the sake of economy in manufacture to provide a wide spread device having only a single helicoid vane or its equivalent extending the entire length of the drum rather than two diametrically opposed helicoid vanes arranged in 180° phase relation.

It has now been determined that a statically and dynamically balanced wide spread device may be obtained by providing a single helicoid vane of exactly one revolution or a multiple thereof on each side of the mid-point or transverse center line of the wide spread device, the two vanes being oppositely directed in order to direct the manure distributed thereby to both sides of the line of travel with the inner ends of the two oppositely directed helicoid vanes lying in the same axial plane and starting from the transverse center line of the wide spread device. In order to produce an even spreading it is desirable to space the inner ends of the vanes apart an equal distance on opposite sides of the transverse center line of the drum.

With the above in view, therefore, it is the principal object of the present invention to provide a wide spread device comprising a drum and two opposite directed helicoid vanes of exactly one revolution,—360°—or a multiple thereof, the inner ends of said vanes lying in the same axial plane on the same side of the axis of the drum.

In all spreaders now in general use with which I am familiar, more or less difficulty has been encountered in keeping long pieces of straw, binder twine and other strand material that may be contained in the manure from becoming wrapped around between the ends of the wide spread device and the bearings for the shaft thereof, this being so because such wrapping of strand material has a tendency to occur more particularly around small diameter rotating members, such as the rotating shaft of a wide spread device, and to cause trouble where such members adjoin stationary members, such as the bearings for the shaft.

Another object of the present invention, therefore, is to provide an improved construction of wide spread device whereby the above mentioned difficulty is practically eliminated.

Other objects and advantageous features will be apparent from the following description of the preferred embodiment of my invention taken in connection with the accompanying drawing, in which:

Figure 1 is a top plan view of the rear portion of a conventional type of manure spreader equipped with my improved wide spread device;

Figure 2 is an end view of the wide spread device and the means for supporting it on the side frame members of the vehicle; and Figure 3 is a fragmentary horizontal transverse sectional view through one end of the drum of the wide spread device and the bearing mounting thereof, illustrating the means for preventing straw, etc., from getting into the space between the ends of the drum and the bearings.

Referring to the drawing, the manure spreader fragmentarily illustrated is of the type adapted to be propelled by a tractor having a power take-off connection with the tractor motor. A spreader of this type is shown in the application of Starley S. Swanson and Leonard B. Neighbour, Serial No. 556,498, filed August 12, 1931, in which the beater and wide spread device are driven by power from the tractor motor and the traveling conveyor is driven by power from the rear wheels of the spreader, and it is believed that a brief description of the conventional parts shown will suffice. The distributor body indicated as an entirety by the numeral 5 is supported at the rear on two wheels 6 mounted on an axle 7 and provided with the usual ratchets to cause rotation of the axle upon forward movement of the distributor.

The material to be distributed is carried in the body of the distributor and is caused to travel gradually rearwardly therein when the machine is in operation either by an endless conveyor or by an apron of more or less conventional construction, indicated as an entirety by the numeral 8, which operates in the lower portion of the body and is moved rearwardly by power derived from the rear axle 7 in any suitable manner, as by the mechanism illustrated and described in said Swanson and Neighbour application above mentioned.

The distributor is provided with a main beater 9, an auxiliary beater 11, and a wide spread device which is indicated as an entirety by the numeral 12. The beaters and the wide spread device are driven by power derived from the power take-off of the tractor by suitable mechanism which will be briefly described. A longitudinally extending power shaft 13 is driven by the power take-off shaft of the tractor through suitable interconnecting mechanism, not shown, and the shaft 14 of the main beater 9 is driven by the shaft 13 through suitable interconnecting gearing enclosed within the housing 15. The auxiliary beater 11 is driven from the shaft 14 of the main beater 9 by a chain 16 trained around a sprocket 17 fixed to the right hand outer end of the main beater shaft 14, and a sprocket fixed on the outer right hand end of the auxiliary beater shaft. The wide spread device is driven from the main beater shaft 14 through a drive chain 18 trained around a sprocket 19 fixed on the shaft 14 inside the sprocket 17, and around a sprocket 22 fixed on the end of the supporting shaft 23 of the wide spread device. This driving means is similar to that shown and described in said Swanson and Neighbour application, and, therefore, it is deemed unnecessary to further describe the same herein.

The wide spread device, with which the present invention is more particularly concerned, comprises the supporting shaft 23 above mentioned which is journaled at its opposite ends in bearings 24 and 25, respectively, supported in suitable perforations provided therefor in plates 26 and 27, respectively, which extend upwardly from and are suitably secured in any suitable manner, as by bolts 28, to the frame members or beams 31 and 32, respectively, which extend rearwardly from opposite sides of the vehicle body. The bearings 24 and 25 are not bolted or otherwise secured to the plates 26, but, being supported in said perforations, are capable of movement with respect thereto, as when the machine travels over rough ground.

More or less difficulty has been experienced with the wide spread devices of distributors now on the market in that long pieces of straw, etc. become wrapped around between the ends of the wide spread device and the bearings for the shaft thereof, but this has been practically eliminated by the present construction, as will now be described.

As shown in Figure 3, each of the bearings 24 and 25 is provided with a radially extending flange 36 formed integral with or carried by the inner end thereof, and formed integral with or carried by the flange 36 is an inwardly extending ring portion or member 37. A hub 38 is fixed to each end of the shaft 23 of the wide spread device between the bearings 24 and 25 and just inside thereof, as shown, and these hubs carry cylindrical members or rims 39, that extend into and are secured to the central member or drum 40 of the rotatable member of the wide spread device. The members 39 extend beyond the ends of the drum 40 and overlap the rings 37.

As will be readily apparent, by providing the flanges 36 and large diameter rings 37 on the stationary bearings which are overlapped by the ends of the drum, or the extensions 39 thereof, the shaft 23 of the wide spread device is substantially completely shielded against straw etc. becoming wrapped around said shaft at the bearings. It is obvious, of course, that the extensions 39 could be replaced by the ends of the drum 40 itself, in which case the only function of the hubs 38 would be to secure the drum 40 to the shaft 23.

The wide spread device 12 comprises the drum 40 mentioned above, which is preferably made of sheet metal, and is suitably fixed at its opposite ends by rivets 41, or in any other suitable manner, to the respective cylindrical members 39 of the hubs 38. The drum 40 is provided with two oppositely directed helicoid vanes 44 and 45 each of which subtends exactly 360° or a multiple thereof between its ends. These vanes are fixedly mounted on the drum 40 in any suitable manner, with their inner ends 46 and 47, and also their outer ends 48 and 49, respectively, lying on the same side of the axis of the drum 40 and in the same axial plane. As shown, the inner ends 46 and 47 of the right and left hand vanes, respectively, are spaced apart an appreciable distance from each other and are symmetrically disposed at opposite sides of the center of the drum 40, measured axially thereof, or in other words, of the transverse center line of the wide spread device. Tests have shown that this spacing, indicated by $a$ in Figure 1, produces an exceptionally even distribution of the manure or other material over the swath.

If the two helicoid vanes were not spaced apart at the center of the drum an appreciable distance an uneven spreading action would occur; that is to say, less manure or other material would be deposited at the center of the swath than at the sides, and this objectionable feature is avoided by my present construction. By having the spacing $a$, described above, provision is made for a portion of the distributed material to be directed directly backwardly between the two vanes, but this does not necessarily preclude all physical connection between them, since they could be physically joined at their inner ends by a connection of suitable shape that would not materially impede the passage between them of the material to be discharged.

While I have illustrated my improved wide spread device as incorporated in a manure spreader of the tractor propelled type as above mentioned, it is to be expressly understood that the invention is not to be limited to use with such a spreader only, as it may also be applied to a spreader of the horse drawn type in which the power for driving the heaters and the wide spread device is derived from the rear wheels of the spreader, or to other machines for general distribution purposes.

I claim:

1. A wide spread device for manure spreaders comprising a drum, and two oppositely directed helicoid vanes of like dimensions on said drum, the inner and outer ends of both vanes being disposed in the same axial plane and on the same side of the axis of the drum, whereby said wide spread device is statically and dynamically balanced.

2. A wide spread device for a manure spreader comprising a drum, and two oppositely directed helicoid vanes of like dimensions on said drum, the inner and outer ends thereof being disposed in the same axial plane and on the same side of the axis of the drum, the inner ends of said vanes being spaced a substantial distance apart and symmetrically disposed at opposite sides of the transverse center line of the wide spread device, whereby said wide spread device will operate to spread evenly and be statically and dynamically balanced.

3. A wide spread device for manure spreaders comprising a shaft, bearings for the ends of said shaft, and means for preventing material from winding on said shaft adjacent said bearings, said means comprising a flange movable with and extending radially from each of said bearings, a lateral ring member formed integral with the outer periphery of each of said flanges and extending inwardly therefrom, and means carried by the shaft and overlapping said ring members.

4. A wide spread device for manure spreaders comprising a shaft, bearings for the ends of said shaft, a hub fixed to each end of said shaft adjacent the inner side of each bearing, a drum secured to said hubs, and means for preventing material from winding on said shaft adjacent said bearings, said means comprising a ring member carried by each of said bearings and extending inwardly therefrom, each of said hubs having a cylindrical laterally extending periphery formed integral therewith and overlapping the adjacent ring member.

5. A wide spread device for manure spreaders comprising a shaft, bearings for the ends of said shaft, a hub fixed to each end of said shaft adjacent the inner side of each of the bearings therefor, a rim member formed integral with each of said hubs, a drum secured to said integral rim members, and means for preventing material from winding on said shaft adjacent said bearings, said means comprising a flange formed integral with and extending radially outwardly from each of said bearings, a lateral ring member formed integral with the outer periphery of each of said flanges, and extending inwardly therefrom and a cylindrical extension projecting outwardly from each of said rim members, said cylindrical extensions overlapping the adjacent ring members.

STARLEY S. SWANSON.